March 17, 1953     R. H. HAGOPIAN     2,632,091
DIELECTRIC HEATING WITH TUBE-OSCILLATOR GENERATORS
Filed Dec. 7, 1948
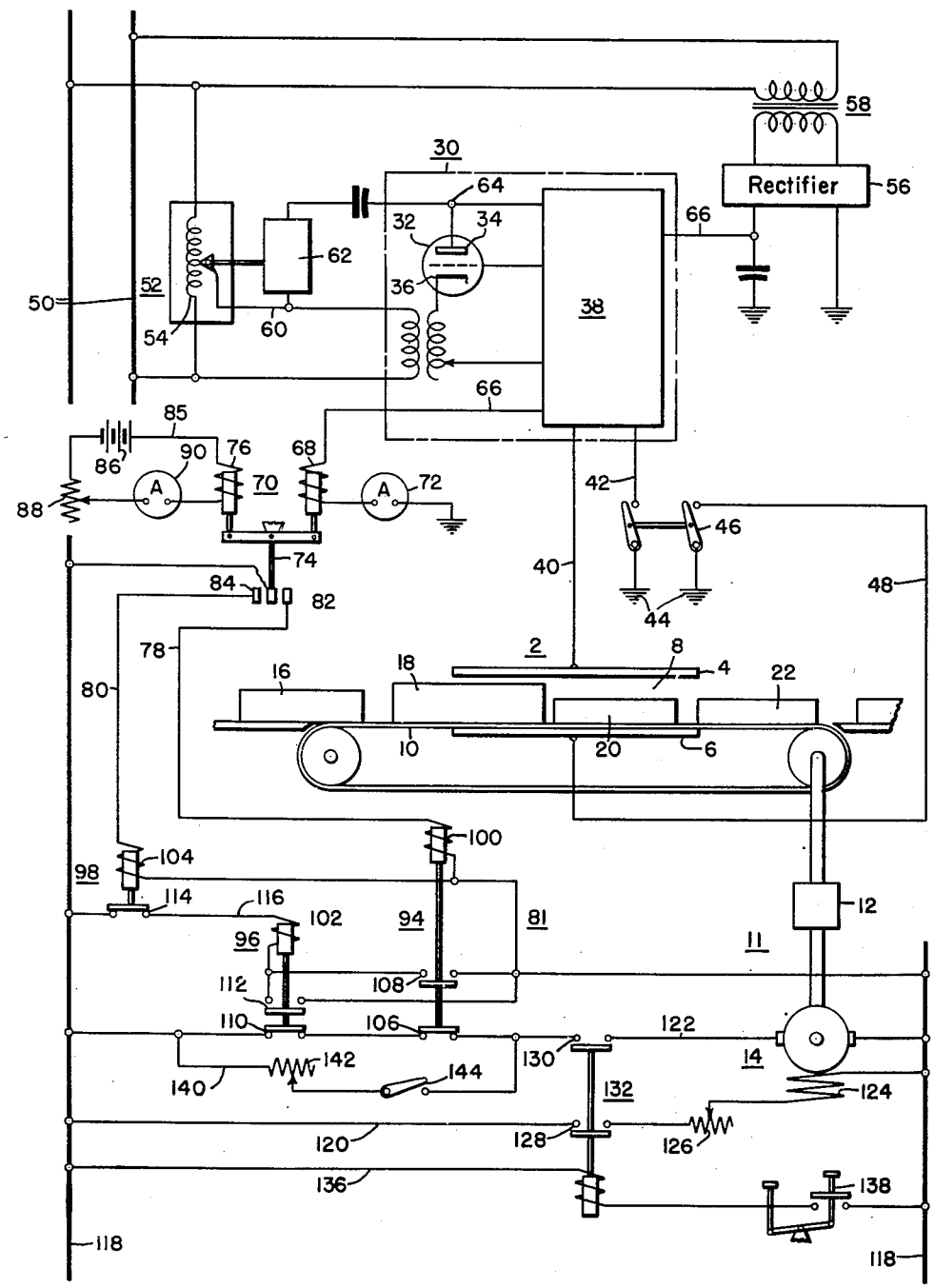
WITNESSES:
Edward Michaels
Nw. C. Groome
INVENTOR
Richard H. Hagopian.
BY
B. L. Zangwill
ATTORNEY Patented Mar. 17, 1953

2,632,091

UNITED STATES PATENT OFFICE 2,632,091

DIELECTRIC HEATING WITH TUBE-OSCILLATOR GENERATORS

Richard H. Hagopian, Baltimore, Md., assignor to Westinghouse Electric Corporation, East Pittsburgh, Pa., a corporation of Pennsylvania Application December 7, 1948, Serial No. 64,011

4 Claims. (Cl. 219—47)

Broadly, my invention relates to high-frequency heating systems of a type which uses a conveyor, or the equivalent, to move work through a heating station supplied with a high-frequency electrical energy that heats the work. The heating station includes a heating device having a work-passage that receives the work. The heating device is such that, when energized, it establishes an electric or magnetic field in the work-passage, the field inducing heat in the work. Since an electric field is usually associated with capacitors and a magnetic field with inductance coils, I designate the heating device as a reactive heating device. For dielectric heating the reactive heating device has a capacitance provided by the equivalent of a pair of spaced relatively insulated heating-electrodes and the work therebetween being heated by the electric field between the heating-electrodes. For induction heating, the reactive heating device has an inductance provided by a conductor or coil and the work associated therewith being heated by the magnetic field thereof. For dielectric heating the work usually is a poor conductor of electricity, and generally is an insulating material, such as, for example, a plastic. For induction heating the work usually is a good conductor of electricity, and generally is metal.

In both dielectric heating and induction heating the work being heat-treated has an important influence on the magnitude of the electrical impedance of the reactive heating device, and especially on its reactance. The impedance of the reactive heating device will change as the physical properties of the work being heated change or as the work fed to the reactive heating device changes in size and character. An example of a situation of this kind occurs when foamed latex rubber masses of different sizes for mattresses are carried on a continuously-moving conveyor through the reactive heating device for dielectric heating.

In a particular system, the conveyor carries the rubber masses successively between a pair of heating-electrodes which have a predetermined separation and are electrically energized by a tube-oscillator generator. Mattress-masses of different thicknesses are placed on the conveyor with their ends facing and with varying spacing between the facing ends. The heating length of the heating-electrodes spans about two length-distances of good-sized mattress-masses. Uniform drying of the many mattress-masses on the continuously moving conveyor can be obtained by keeping the voltage across the heating-electrodes substantially constant although the thickness or spacing of the mattress-masses varies. Systems for maintaining a constant voltage across a pair of dielectric heating-electrodes are disclosed in the application of S. I. Rambo, B. Boyd and R. H. Hagopian, Serial No. 64,021, now abandoned, and in my application Serial No. 64,013, now Patent No. 2,545,997, both filed concurrently herewith.

In the former patent-application, a high-frequency heating system including a tube-oscillator generator is disclosed in detail. The system includes means that takes a measure of the high-frequency voltage that the generator provides across the heating-electrodes, and continuously balances this voltage against an adjustable datum voltage. Any deviation of this high-frequency voltage from the desired voltage initiates operation of apparatus that automatically adjusts the tube-oscillator generator. The adjustment is in a direction to restore the voltage across the heating-electrodes to the desired value. Such adjustment reflects a change in the power output of the generator so that it does not necessarily operate at its most economical point. A particular purpose of my invention is to provide a high-frequency heating-system of this general kind with additional means that assures a more efficient and economical use of the high-frequency power generating equipment.

My invention can be understood more readily in connection with the aforesaid heating-system for dielectrically drying progressing rubber mattress-masses, which constitutes the best mode of which I am at present aware for applying my invention. In treating such mattress-masses on a commercial basis, different sizes are continuously passed through a single pair of heating-electrodes for drying; and these mattress-masses are placed on the conveyor in an orderly fashion or in a haphazard manner. In either case, the amount of rubber between the heating-electrodes and the physical characteristics of different portions of the rubber continually changes. As a result, the electric loading of the reactive heating-device, which consists of the spaced heating-electrodes in this case, changes so that the tube-oscillator generator which energizes the heating-device will inherently vary in a manner tending to meet this loading.

In the prior practice it has been customary to provide a tube-oscillator generator having a rating capable of supplying the maximum loading that it was expected to heat so that the rubber conveyed by the constantly moving conveyor would be properly dried. With lesser loadings the tube-oscillator generator will naturally supply only the lesser demand and would not be operated at its full capacity. This is economically wasteful when the high cost of tube-oscillator generators is taken into consideration. In the patent to Hart, Jr., et al., No. 2,251,277, dated August 5, 1941, a tube-oscillator generator is controlled by the load-demand on it, delivering more power to the heating-electrodes when the load demand is greater and vice versa. Such a system must necessarily be continually adjusted for loadings lesser than that corresponding to its rated capacity. In the situations where such lesser loadings are usual, the generator will not be operated at its full rated capacity for most of its operating time. A single tube-oscillator generator of smaller output capacity cannot be substituted because it would be over-loaded when the higher loadings do come on. Should a smaller tube-oscillator nevertheless be used, protective equipment will probably deenergize the smaller generator in order to avoid damaging it; and the generator can then be restored to operation only with a loss of productive-time and the use of man-power. Through the use of my invention, a much smaller generator can be used without such difficulties.

In accordance with the preferred form of my invention, the size of the generator is less than that which the maximum expected loading would indicate. Preferably, the size of the generator is determined by the average load to be carried by the conveyor between the heating-electrodes rather than by the maximum load. Whenever this smaller generator is called upon to heat a load larger than its rating, it is not put out of service because of the overload. Instead, the conveyor carrying the load is preferably temporarily stopped so that the more-than-average load can be continuously heated for a longer-than-average time, and until it has received enough heat for the drying-out process. By causing the conveyor to stop when larger-than-average loads are on the conveyor, and permitting the smaller generator to deliver its rated output to such load, the smaller generator will obviously be operated at its rated output for a substantial part of the time of its total energization, and it need not be shut-down periodically. A still smaller generator would operate at its rated output for an even greater fraction of its total operating time.

An object of my invention is to provide a low cost high-frequency heating system utilizing a tube-oscillator generator and reactive heating device, in which material is fed to the heating-device in a varying manner, the system being such that it can use a tube-oscillator generator of a rating less than that which corresponds to the maximum rate at which the heating-device may be called upon to heat-treat the material. The system has means, responsive to the existing load-demand, that changes the rate of progress of the material through the heat-inducing field of the reactive heating-device, either by temporarily stopping the progress of the material already in the field, or slowing down such progress.

A further object of my invention is to provide a low-cost high-frequency dielectric heating system having a tube-oscillator generator and heating-electrodes across which the generator maintains a constant voltage and between which materials of different thickness or other variable characteristics are passed from time to time, thereby causing the impedance between such heating-electrodes to change from time to time. The system, however, is provided with means responsive to this changing impedance for stopping or slowing down the conveyor whenever this changing impedance causes the generator to deliver power at its rated capacity.

A further object of my invention is to provide an economical and efficient system for heating rubber on a moving conveyor dielectrically with a relatively low-cost tube-oscillator generator.

Objects, features and innovations of my invention in addition to the foregoing will be apparent from the following description thereof which is to be taken in conjunction with the drawing. The single schematic figure of the drawing is a schematic representation of my invention, in which parts known to the art are shown in simplified and abbreviated form.

Referring to the drawing, a reactive heating device of a type referred to previously is indicated in its entirety by the reference numeral 2. It comprises a pair of parallel relatively insulated heating-electrodes 4 and 6 of metal plates having the general form of rectangles. The heating-electrodes 4 and 6 are horizontally disposed and vertically spaced apart to provide a work-receiving space or passage 8. A conveyor 10, in the form of an endless belt, has a top run that rides on the surface of the lower heating-electrodes 6. The conveyor is driven by a drive means 11 comprising a speed-reducing gearing 12 and an electric motor 14. When the motor is energized the top run of the conveyor 10 carries a plurality of distinct pieces or rubber masses 16, 18, 20 and 22, for example, successively between the heating-electrodes 4 and 6 for drying, with or without partial curing, by an electric field that is established between the heating-electrodes when they are energized with high-frequency energy.

The high-frequency energy for energizing the heating-electrodes 4 and 6 comes from a tube-oscillator generator 30 that is shown in simplified form. The tube-oscillator generator 30 is shown as comprising a vacuum tube means 32 having an anode or plate 34, a cathode 36, an oscillatory or tank circuit 38, an adjustable impedance coupling-network if desired, and high-frequency output conductors 40 and 42.

The output conductor 40 is connected to the upper heating-electrode 4 and both are insulated from ground. The other output conductor 42 is connected to the lower heating-electrode 6 through a ground connection comprising grounding points 44, switches 46 and a conductor 48. However, the output conductor 42 and the heating-electrode 6 may be directly grounded if desired; or they may both be insulated from ground and directly connected to each other, as is understood in the art. The switches 46 have therefore been included in the schematic showing to indicate the many optional connections well known to one skilled in the art.

The tube-oscillator generator 30 derives its power from a commercial A. C. power line 50. More specifically, the cathode 36 of the tube 32 receives a variable amount of power from a device 52 that includes an adjustable transformer winding 54 connected to the power line 50. The plate 34 of the tube 32 receives high voltage D. C. power from a rectifier 56 fed by the secondary of a transformer 58, the primary of which is connected to the power line 50.

The cathode energy is controlled through the movement of a tap 60. Tap 60 is moved in one direction or the other by a driving mechanism 62 whenever the high-frequency potential at a point 64 in the high-frequency output circuit of the tube 32 varies. This potential is a direct measure of the voltage across the heating-electrodes. The tap 60 is adjusted in such a manner as to keep the high-frequency voltage across the heating-electrodes 4 and 6 substantially constant. A utilizable system of this kind is disclosed in greater detail in the aforesaid joint application of Rambo, Boyd and myself, to which reference may be had for such details.

The tube-oscillator generator has a D. C. plate-cathode circuit 66, associated with the tube 32, that includes a current coil 68 of a differential or polarized relay 70. The circuit 66 also includes an indicating instrument in the form of an ammeter 72. The relay 70 further comprises a pivoted or balanced beam 74 and a second coil 76.

The polarized relay 70 is representative of any suitable variably-operable electric device which operates differently in accordance with different values of current in the plate-cathode circuit 66. For the purpose of the specific embodiment herein disclosed, the variably-operable electric device, in the specific form of the polarized relay 70, has a circuit-selecting means operable to control two different circuits 78 and 80 of a controller 81 for the drive 11. The coils 68 and 76 comprise two members acting against each other; and the circuit which the circuit-selecting means closes is determined by whichever of the members predominates over the other. In the specific embodiment being described, the two coils 68 and 76 of the polarized relay 70 are in opposition for turning the balanced beam 74. Should the coil 68 predominate over the coil 76, the beam 74 swings to close the circuit 78, through a contact 82. Should the coil 76 prevail, the beam 74 swings into engagement with a contact 84 to close the circuit 80.

The coil 76 is in a circuit 85 arranged to maintain the current in this coil at a predetermined but adjustable datum value. The circuit 85 comprises a battery 86, a variable resistor 88 and an indicating instrument 90. The current through the coil 76 is adjusted to a datum value such that the beam 74 will be balanced when the current through the coil 68 is representative of the maximum rated output of the tube-oscillator generator 30, or is representative of any other desired datum level of power output for such generator. In accordance with our invention, this balance is disturbed by a load on the generator that demands more power than the datum value. The unbalance causes the variably-operable electric device in the specific form of the polarized relay 70 to operate the controller 81 which, in turn, affects the drive 11 so as to slow down or stop the conveyor 10. Specifically, the controller operates on motor-controlling or -energizing circuits that determine the speed of operation of the motor 14; it being assumed that a stopped motor has a speed of zero at which the conveyor 10 has a corresponding zero rate of movement.

The controller 81 specifically comprises a plurality of relays 94, 96 and 98 having operating coils 100, 102 and 104, respectively. The relay 94 also has a first set of contacts 106 and a second set of contacts 108. The contacts 106 are closed and the contacts 108 are open when the operating coil 100 of the relay is deenergized. The contacts 106 are opened and the contacts 108 are closed when the operating coil 100 of the relay is energized. The relay 96 has a set of contacts 110 and a set of contacts 112. The contacts 110 are closed and the contacts 112 are open when the operating coil 102 of the relay is deenergized, and vice versa. The relay 98 has a set of contacts 114 that is closed when the operating coil 104 of the relay is deenergized, and vice versa.

The operating coils 100 and 104 are, respectively, in the circuits 78 and 80; and the operating coil 102 of the relay 96 is in a circuit 116 that includes the contacts 108 and 112 in parallel, and the contact 114 in series.

The controller 81 controls the energization of the motor 14. To this end the motor 14 is preferably a D. C. motor having energizing circuits across conductors 118 of a D. C. power line. The energizing circuits comprise a field circuit 120 and an armature circuit 122. The field circuit 120 comprises a motor field winding 124 and a speed-setting variable resistor 126. The armature circuit 122 includes switching means therefor that comprises the sets of contacts 106 and 110 of the relays 94 and 96, respectively, the contacts being in series.

Sets of contacts 128 and 130 of a relay 132 of a start-stop system for the motor 14 are also included in the field and armature circuits 120 and 122. This start-stop system includes a circuit 136 of any conventional form, and the contacts 128 and 130 can be closed when a start button 138 is closed for energizing the relay 132 in the start-stop circuit 136.

For describing the operation of my novel high-frequency heating system, assume that all relays shown in the drawing are deenergized. The sets of contacts 106, 110 and 114 will be closed and the sets of contacts 108, 112, 128 and 130 will be open. Assume that the start button 138 is closed, thereby causing energization of the relay 132 and closing of the sets of contacts 128 and 130. The motor-energizing circuits 120 and 122 will be energized and the motor 14 will operate at a speed determined by the adjustment of the resistor 126. The motor 14, through gearing 12, drives the conveyor which carries the different-sized rubber mattress-masses 16, 18, 20 and 22 successively through the reactive heating means 2, more specifically between the heating-electrodes 4 and 6.

In practice, it has been found that rubber mattress-massess successively fed to the heating-electrodes 4 and 6 by the conveyor 10 vary in size and thickness, and in spacing between the masses. For such conditions, it is desirable, as previously described, to keep the voltage across the heating-electrodes 4 and 6 substantially constant. The maximum loading of, or heat-demand on, the heating-electrodes 4 and 6 will occur when the thickest mattress-means successively follow each other with their ends contiguous, assuming other things to be equal. In practice, such maximum loading or heat-demand, however, occurs only rarely, and, in accordance with my invention, is not used to determine the rating of the tube-oscillator generator. For example, assume that the operating rating of the chosen generator corresponds, at least roughly, to a heat-demand that is an average of the loadings passing through the heating-electrodes when the conveyor moves at a constant speed which generally will be as high as practicable. The average loading represents the average condition expected over the full operating time of the heating-system. In other words, during some of this time the loading will be heavier and during some of the time the loading will be lighter to balance.

As is known to the art, in a system such as that described, when the loading is lighter, the current in the circuit 66 will tend to decrease and when the loading is heavier, the current will tend to increase.

The current in the datum adjusting circuit 85 is adjusted through resistance 88 to a magnitude that causes the coil 76 of the polarized relay 70 to act on the beam 74 with a force balancing the action of the coil 68 when the last is traversed by a plate-current of a proper magnitude in the plate-cathode circuit 66. The proper plate-current magnitude can be chosen to be that obtained when the tube-oscillator generator 30 is delivering substantially rated operating output and less than that required for the expected maximum heat-demand. Preferably the chosen magnitude corresponds to the aforesaid average loading.

With the polarized relay 70 balanced, its beam 74 will be in a neutral position between the contact points 82 and 84, and the control circuits 78 and 80 of the controller 81 will be deenergized. This means that the relays 94, 96 and 98 will be deenergized and the motor energizing circuits 120 and 122 remain completed because the previous closing of the start button 138 has energized relay 132.

Assume now that the loading between the heating-electrodes 4 and 6 decreases. The current in the coil 68 of the polarized relay 70 decreases. The current in the coil 76 has not changed. Accordingly, the coil 76 predominates over coil 68, and the beam 74 will swing into engagement with the contact 84. The circuit 80 will be completed to the operating coil 104 of the relay 98 and the contacts 114 thereof will open. However, this will have no effect on the relay 96 which has contacts 110 in the armature circuit 122, and the speed of the motor 14 is not affected.

Should, however, the load between the heating-electrodes 4 and 6 increase, as for example, by a plurality of relatively thicker mattresses following each other consecutively, the current in the circuit 66 will increase. The beam 74 will swing into engagement with the contact 82, completing the circuit 78. The operating coil 100 of the relay 94 will be energized and open its contacts 106. The armature circuit 122 will thereby be interrupted and the motor 14 stopped. The conveyor 10 also will be stopped and the thicker mattresses will remain between the heating-electrodes 4 and 6 for continued heating.

When the operating coil 100 of the relay 94 energizes, its contacts 108 are closed, completing the circuit 116 that includes the operating coil 102 of the relay 96. Upon energization of relay 96, contacts 110 open and contacts 112 close. The former operation further interrupts the motor armature circuit 122. The latter operation establishes a holding branch for the operating coil 102 of relay 96 so that this relay will remain energizing should the circuit 78 subsequently be interrupted.

While the motor 14 remains stopped, the mattress masses between the heating-electrodes 2 and 4 absorb heat energy. As the rubber masses continue to dry out, their dielectric constant decreases and the reactance between the heating-electrodes 4 and 6 increases, representing a lesser loading therebetween. The plate-cathode current in the circuit 66 correspondingly decreases gradually and the beam 74 ultimately returns to a balanced position shown in the drawing. In this position, the circuit 78 which includes the operating coil 100 of the relay 94 is interrupted, but the motor 14 remains stationary because of the locked or operated condition of the relay 96. It is only when the loading between the heating-electrodes 4 and 6 has decreased sufficiently to cause the coil 76 of the polarized relay 70 to predominate over the other member of the relay 70, namely the coil 68, that the motor is again energized for moving the conveyor. Specifically, this happens when the coil 76 forces the beam 74 against the contact 84. This causes the circuit 80 to become energized, energizing the operating coil 104 of the relay 98 so that the contacts 114 in the circuit 116 are opened. This causes the operating coil 102 of the relay 96 to become deenergized so that the contacts 110 now close and the contacts 112 open. With the contacts 106 and 110 both closed, the motor 14 is reenergized.

Should the loading of the heating-electrodes 4 and 6 increase to a point where the beam 74 leaves contact 84 without engaging the contact 82, the operating coil 104 of the relay 98 is deenergized so that contacts 114 are closed. This has no further effect because the contacts 108 and 112 are open under the described condition, and prevent energization of the circuit 116.

By having the spacing between the contacts 82 and 84 adjustable, an adjustable anti-hunting expedient is obtained; and stopping and starting of the motor 14 will take place at different values of current in the circuit 66.

Instead of stopping the motor completely when an excessively high load moves into the work-receiving space between the heating-electrodes 4 and 6, the motor can be slowed down. For this purpose another motor-energizing circuit 140 is provided which includes a resistor 142 and a switch 144. This circuit 140 parallels the series connection of the contacts 106 and 110. By closing the switch 144, opening of either or both of the contacts 106 and 110 in the manner previously described inserts the resistance 142 in the armature circuit 120 of the motor 14, and so causes the motor to slow down rather than to completely stop as it does when the switch 144 is open.

My invention has particular applicability to dielectric heating with tube-oscillator generators operating at very high frequencies. As is well known, such generators are commercially available only in limited output ratings. By having such rating correspond to the average heat-demand or loading previously described, the limited-size generators can be used to heat-treat material on a mass-production basis, and can be operated at substantially full rated capacity for most of the heating process.

While I have described my invention in the form which is now preferred, it is obviously subject to wide ramifications and modifications and is applicable to other types of high-frequency heating systems. Consequently, the claims should be interpreted in the broadest manner limited only by the requirements of the prior art.

I claim as my invention:

1. High-frequency heating equipment comprising, in combination, a high-frequency tube-oscillator generator having a normal rated output power; a heating station comprising a reactive heating device electrically connected to said generator for receiving power therefrom, said reactive heating device having a work-passage for receiving work to be heat-treated, the work being an electric loading for the reactive heating device that affects the reactance of the reactive heating device, said reactance having a tendency to increase as an effect of the aforesaid heat-treatment of said work, said station also comprising a movable conveyor for moving work through said work-passage, and a drive for said conveyor; a controller connected to said conveyor-drive and controlling the movement of said conveyor by said drive; a variably-operable electrical device electrically connected to said generator and characterized by being differently responsive in accordance with the power delivered to said reactive heating device by said generator; and electrical connections between said electrical device and said controller automatically operating said controller in accordance with the different responses of said electrical device, said drive comprising an electric motor and an energizing circuit therefor, and said controller including means for interrupting the energizing circuit to said electric motor when the effective reactance of said heating device decreases such that the work takes power from the generator at a rate greater than said rated output power of the tube-oscillator generator, and completing the motor-energizing circuit when the effective reactance of said heating device increases such that the work takes power from the tube-oscillator generator at a rate less than said rated output power.

2. High-frequency heating-equipment for heating work which changes in electrical reactance properties during heating comprising, in combination, a high-frequency tube-oscillator generator of a predetermined rated output, a pair of relatively insulated heating-electrodes connected to said tube-oscillator generator, said heating electrodes being spaced to receive a full work load having a minimum reactance and lesser work loads having respectively greater reactances than said full work load therebetween for heating to a predetermined extent at which a given reactance occurs in said work load, a conveyor arranged to progress said work between said heating-electrodes for said heating, a drive for said conveyor, said drive including a speed-selecting means selectively operable to move said conveyor at a first speed or at a materially lower speed, the spacing of said heating electrodes being such that said rated output is inadequate for said heating of a full work load on said conveyor moving at said first speed, and an electrical device connected to said generator and responsive to different output characteristics of said tube-oscillator generator, said electric device being operable on said speed-controlling means automatically to control said speed-controlling means in response to output characteristics of said tube-oscillator generator, such that said conveyor is moving at said first speed only when the reactance of said work load is more than said given reactance.

3. High-frequency heating-equipment for heating work which changes in electrical reactance properties during heating comprising, in combination, the high-frequency tube-oscillator generator of a predetermined rated output power, a pair of relatively insulated heating-electrodes connected to said tube-oscillator generator, said heating-electrodes being spaced to receive a full work load having a minimum reactance and lesser work loads having respectively greater reactances than said full work load therebetween for heating to a predetermined extent at which said work load has a given reactance, a conveyor arranged to progress work between said heating-electrodes for said heating, a drive for said conveyor, said drive comprising an electric motor, motor-controlling means comprising a first circuit for operating said motor for driving said conveyor at a first speed, and a second circuit for interrupting said first circuit so as to stop said motor, said first speed of said conveyor being such that said rated output power is inadequate for said heating of a full load having a minimum reactance on said conveyor moving at said first speed, a switching device connected to select which of said circuits is to be effective, an electric device connected to said tube-oscillator generator and responsive to different output characteristics of said tube-oscillator generator, and reflecting the load demand thereon, said electrical device controlling said switching device to automatically selectively connect said circuits in accordance with the load-demand and therefore the work load reactance reflected in the output characteristics of said tube-oscillator generator.

4. High-frequency heating-equipment for heating work which changes in electrical reactance properties during heating comprising, in combination, the high-frequency tube-oscillator generator of a predetermined rated output power, a pair of relatively insulated heating-electrodes connected to said tube-oscillator generator, said heating-electrodes being spaced to receive a full work load having a minimum reactance and lesser work loads having respectively greater reactances than said full work load therebetween for heating to a desired extent materially changing the electrical reactance properties of the work, a conveyor arranged to progress work between said heating-electrodes for said heating, a drive for said conveyor, said drive comprising an electric motor, motor-controlling means comprising a first circuit for operating said motor for driving said conveyor at a first speed, and a second circuit for operating said motor to drive said conveyor at a materially lower speed, said first speed of said conveyor being such that said rated output power is inadequate for said heating of a full load having said minimum reactance on said conveyor moving at said first speed, means for maintaining the voltage supplied by said tube-oscillator generator to said heating-electrodes substantially constant, a switching device connected to select which of said circuits is to be effective, an electric device connected to said tube-oscillator generator and responsive to different output characteristics of said tube-oscillator generator, and reflecting the load demand thereon, said electrical device controlling said switching device to automatically selectively connect said circuits in accordance with the load-demand and hence load reactance reflected in the output characteristics of said tube-oscillator generator.

RICHARD H. HAGOPIAN.

REFERENCES CITED

The following references are of record in the file of this patent:

UNITED STATES PATENTS

| Number | Name | Date |
|---|---|---|
| 2,391,085 | Crandell | Dec. 18, 1945 |
| 2,391,086 | Crandell | Dec. 18, 1945 |
| 2,416,172 | Gregory et al. | Feb. 18, 1947 |
| 2,453,680 | Sweeny | Nov. 9, 1948 |
| 2,458,563 | Collins | Jan. 11, 1949 |
| 2,464,336 | Michel | Mar. 15, 1949 |
| 2,482,545 | Jordan | Sept. 20, 1949 |
| 2,508,752 | Drugmand | May 23, 1950 |